United States Patent
Ensslin et al.

(10) Patent No.: US 7,460,791 B2
(45) Date of Patent: Dec. 2, 2008

(54) DETECTION OF OPTICAL LIGHT POWER

(75) Inventors: Ulrich Ensslin, Stuttgart (DE); Bärbel Gaiser, Sindelfingen (DE)

(73) Assignee: Daimler AG, Stuttgart (DE)

( * ) Notice: Subject to any disclaimer, the term of this patent is extended or adjusted under 35 U.S.C. 154(b) by 523 days.

(21) Appl. No.: 10/874,749

(22) Filed: Jun. 24, 2004

(65) Prior Publication Data

US 2005/0019041 A1    Jan. 27, 2005

(30) Foreign Application Priority Data

Jun. 26, 2003    (DE) ................ 103 28 684

(51) Int. Cl.
*H04B 10/06*    (2006.01)
(52) U.S. Cl. .................. 398/202; 398/135
(58) Field of Classification Search ......... 398/135–139, 398/202
See application file for complete search history.

(56) References Cited

U.S. PATENT DOCUMENTS

| | | | | |
|---|---|---|---|---|
| 5,956,168 A * | 9/1999 | Levinson et al. | ............... | 398/41 |
| 6,627,867 B2 * | 9/2003 | Ames et al. | ............. | 250/214 R |
| 7,002,131 B1 * | 2/2006 | Lewis | ................... | 250/214 A |
| 7,062,177 B1 * | 6/2006 | Grivna et al. | ............... | 398/162 |
| 2005/0129415 A1 * | 6/2005 | Tang | ......................... | 398/208 |

FOREIGN PATENT DOCUMENTS

| | | |
|---|---|---|
| DE | 100 55 103 A1 | 5/2002 |
| DE | 101 33 749 A1 | 1/2003 |
| DE | 101 44 339 A1 | 4/2003 |
| DE | 102 38 859 A1 | 3/2004 |
| EP | 1 068 997 A2 | 1/2001 |
| JP | 04346039 A | 12/1992 |
| JP | 2001-122039 | 5/2001 |

OTHER PUBLICATIONS

Translation of Office Action dated Aug. 24, 2007 received in JP 2004-18576.

* cited by examiner

*Primary Examiner*—Leslie Pascal
(74) *Attorney, Agent, or Firm*—Crowell & Moring LLP

(57) ABSTRACT

A receiving unit for a controller for reception of input data is disclosed. The input data is transmitted as optical signals in an optical bus system in a vehicle. The receiving unit is coupled to an optical bus system and has a means for conversion of optical signals to electrical signals. A measurement arrangement is provided which measures a characteristic variable for the optical received power. The receiving unit optimizes the dynamic control of the optical level. The measurement arrangement is in the form of a digital circuit. Furthermore, an output port is provided for passing on the digitized measurement data.

13 Claims, 4 Drawing Sheets

DETECTION OF OPTICAL LIGHT POWER

BACKGROUND AND SUMMARY OF THE INVENTION

This application claims the priority of German Application No. 28 684.5, filed Jun. 25, 2003, the disclosure of which is expressly incorporated by reference herein.

The invention relates to a controller and a receiving unit for a controller for reception of input data which is transmitted in the form of optical signals in an optical bus system in a vehicle.

Optical bus systems are distinguished by data transmission rates of at least 20 Mbit/s to more than 1 Gbit/s, and insensitivity to electromagnetic interference, since optical waveguides are used as the carrier medium. As a result of these characteristics, optical bus systems are suitable for use in vehicles. This relates in particular to telecommunication applications and audio systems.

The multimedia networking technology MOST (Media Oriented Systems Transport) is one example of the use of optical bus systems in vehicles. This technology has been developed by various car manufacturers and suppliers on the basis of an optical bus system which was designed especially for use in the infotainment field for a vehicle. Further information relating to the subject of MOST can be found, for example, in the magazine Elektronik [Electronics], 14/2000, page 54 et seq., and at http://www.mostnet.de. The infotainment field covers the networking of applications such as radio, telephone, navigation, video or DVD. Further optical bus systems for use in motor vehicles include, for example, Byteflight (www.byteflight.com), TTP (Time Triggered Protocol) and FlexRay (www.flexray.com).

Optical bus systems in vehicles are generally designed on the basis of a ring topology. A bus system based on a ring topology, in particular an optical bus system, may be composed of a large number of individual point-to-point connections. A ring segment or transmission path extends between two adjacent points, and is bounded on the input side by a transmitter and on the output side by a receiver. The overall bus system can be operated correctly only if all of the individual transmission paths can operate correctly. This applies in a particular manner to ring systems in which correct operation of all of the ring segments or transmission paths is absolutely essential, when they are in the form of a closed chain of individual successive transmission paths. The failure of a single ring segment, that is to say of a single transmission path in a ring system, leads to failure of the entire communication process (See, for example, Grundlagen des Netzwerkbetriebs [Principles of network operation], 2nd edition, Microsoft Press 1997, pages 44, 45, 801, 808).

DE 101 33 749 A1 discloses a network component for an optical network with an emergency function. The network component is in this case coupled to a ring data bus, and is provided with a receiving unit and a transmitting unit. In the event of a discontinuity in the data bus glass fiber cable, an emergency characteristic is provided, which maintains certain functions of the network component.

It is therefore important to check the serviceability of the bus system. A failure of one component or a component which is operating incorrectly, or a discontinuity in the connecting cable results in failure of the data communication throughout the entire ring system.

In optical bus systems, the data is transported on the optical waveguide by means of light signals. For this purpose, the electrical signals are converted to optical signals for transmission, and the optical signals are converted to electrical signals for reception. This is done by means of optoelectronic or fiber-optical transmitting/receiving units, also referred to as optical/electrical transducers or converters, or FOTs (Fiber Optical Transceivers).

Optoelectronic receivers have to detect the entire range of optical power levels in the optical waveguide. This means that the optoelectronic receiver has to operate well away from its ideal operating point, that is to say at a specific optical power or energy level. This results in the optical bus system being more susceptible to interference.

Various interference influences change the optical power transmitted from the transmitter on the way to the receiver, such that the bandwidth of the optical power that is available at the optoelectronic receiver is undershot or overshot. This leads to an incorrectly operating receiving unit, and thus to failure of the ring system.

The major interference influences are plug contacts, dust deposits on the fiber end, variance in the bending radii and in the fiber lengths, different cable lengths as well as major temperature fluctuations. It should be stressed that these interference influences generally result in an increase in the attenuation in the fiber. Numerical examples for POF (Plastic Optical Fiber) plastic fibers for attenuation increases in the event of an increase in temperature are 0.03 dB/K and, in the case of different cable lengths, are 0.2 dB/m. Further interference influences which cause transmission errors include oscillation of the phase angle, so-called jitter, and pulse-width variation.

DE 102 38 869 A1 discloses a method and an apparatus for temperature management in an optical bus system based on ring topology. This is done by measuring the temperature close to the transmitting/receiving unit of a controller. As soon as the temperature at the transmitting/receiving unit of the controller exceeds a predetermined critical temperature, the transmitting/receiving unit is switched off, and wake-up requirements to the bus system are blocked.

DE 101 44 339 A1 discloses a separate test device for testing the optical waveguide, for example in a workshop. The test device is for this purpose operatively connected to the optical waveguide, in order to activate/deactivate the transmitting unit as required, in order to evaluate a dark value and a light value for the optical data bus, and in order to use these values to determine attenuation information for the optical waveguide to be tested.

DE 100 55 103 A1 discloses a method for optimization of the performance of a bus system which is operating subject to interference influences, in particular an optical bus system. In this method, the transmission power of the transmitter and/or the sensitivity of the receiver are/is controlled on a transmission path as a function of the currently determined level margin. The optical transmission power at the transmitter must be adjustable for this purpose, and/or the light power arriving at the receiver must be measurable.

This dynamic control of the optical level avoids transmission faults in the bus system. The control process sets a stable optical level at the ideal receiver operating point. Additional attenuation is identified, and is regulated out.

Until now, the only way to measure the optical power arriving at the receiver has been by means of analog circuits. These circuits are complex and expensive to manufacture, since the analog circuit comprises a large number of individual modules, which have to be matched to one another. Furthermore, the physical space occupied by a measurement arrangement such as this in the form of an analog circuit is many times greater than the physical space occupied by the optical receiving unit. Furthermore, in particular, analog circuits have the disadvantage that they are highly EMC (electromagnetic compatibility)-sensitive.

The object of the present invention is now to provide a receiving unit and a controller, which receiving unit optimizes the dynamic control of the optical level.

According to the invention, this object is achieved by a receiving unit for a controller including a measurement arrangement. The measurement arrangement is in the form of a digital circuit. Furthermore, the receiving unit has an output port for passing on the digitized measurement data.

It has been found to be advantageous that a digital circuit occupies less physical space than an analog circuit. Digital circuits furthermore have the advantage that they are cheaper to manufacture. Furthermore, digital circuits have lower EMC sensitivity and are therefore less susceptible to interference. A measurement arrangement in the form of a digital circuit is thus cheaper, smaller and less sensitive to interference.

A digital circuit may, in particular be in the form of a semiconductor component, such as an IC (Integrated Circuit), an ASIC (Application Specific Integrated Circuit), an MCM (Multi Chip Module) or part of a "System on a Chip".

A further advantage is that the measurement data from the measurement arrangement is available in digital form at an output port of the receiving unit. A further unit, such as a communication controller or a microcontroller which is part of a controller, can thus use this data for evaluation and control purposes.

In one development of the receiving unit according to the invention, the receiving unit has a means for determination of the optical received power, which means has a memory means in which a characteristic is stored which represents the relationship between the measured characteristic variable and the corresponding optical received power. Furthermore, the means has an evaluation unit, which compares the measured characteristic variable with the characteristic and passes on the optical received power, determined from this, to the output port. The means for determination of the optical received power is in the form of a digital circuit or a software module.

It has advantageously been found that the storage of the relationship between the measured characteristic variable and the corresponding optical received power in the form of a characteristic, and the evaluation by means of the comparison of the measurement data with the stored characteristic, simplifies the determination of the optical received power. In particular, the split into memory means and an evaluation unit assists implementation as a digital circuit or software module.

The memory means is in the form of a non-volatile semiconductor memory, so that the characteristic need not be reloaded when the receiving unit is switched off.

Non-volatile memory means for semiconductor circuits include semiconductor memories such as ROM (Read Only Memory), PROM (Programmable Read Only Memory), OTP (one time programmable PROM), EPROM (erasable PROM) or Flash memory.

The characteristic for the relationship between the measured characteristic variable and the corresponding optical received power may be determined empirically, that is to say for example being measured, or may be calculated by means of appropriate data sheets for the means for conversion of the optical signals. The characteristic variable to be measured and the relationship between the characteristic variable and the optical received power are determined by the means for conversion of the optical signals to electrical signals.

It has advantageously been found that the means for determination of the optical received power in the form of a digital circuit is cheaper, smaller and less sensitive to interference.

The means for determination of the optical received power may also be in the form of a software module, which has the advantage that this is cheaper and more flexible than a digital circuit. For this purpose, the receiving unit must have a corresponding computation means, that is to say by way of example a microprocessor with an input/output unit, memory and power supply.

Since the means for conversion of optical signals to electrical signals is in the form of a receiving photodiode, and the characteristic variable for determination of the optical received power is the induced current or the induced voltage in the receiving photodiode, the receiving unit is optimized. Receiving photodiodes are nowadays commercially available as a standard electronic component, in particular as a semiconductor component for integration in a digital circuit.

The current or voltage which is induced by the received light in the receiving photodiode can be measured by means of very simple current or voltage measurement circuits, such as those which are already used for data processing of the input data before it is passed on, for example to a communication controller.

A further advantage is that the output port of the receiving unit is a bus connection which can be coupled to a bus connection of a further unit by means of a data line, with the data being transmitted from the receiving unit to the further unit via the bus connection by means of a bus protocol. Measurement data and/or data relating to the optical received power as well as input data can thus be transmitted via the one output port. For this purpose, the receiving unit and the further unit, for example a communication controller, must have a bus connection and the appropriate means for data conversion in accordance with the protocol. This is advantageous when the receiving unit is connected to further units of a controller, for example a communication controller and/or microcontroller, via an internal appliance bus.

According to the invention, the object is likewise achieved by a which is coupled to an optical bus by a receiving unit. The receiving unit has an output port for passing on the digitized measurement data to the communication controller and/or microcontroller. The measurement arrangement is in the form of a digital circuit.

It has also been found to be advantageous for the controller to have a means for determination of the optical received power, which means has a memory means in which a characteristic is stored which represents the relationship between the measured characteristic variable and the corresponding optical received power, and has an evaluation unit which compares the measured characteristic variable with the characteristic, and passes on the optical received power determined from this to the output port. The determination of the optical received power for the first time makes it possible to control the optical received power in the receiving unit of the controller.

In one advantageous development of the controller, the means for conversion of optical signals to electrical signals is a receiving photodiode, and the characteristic variable is the current induced in the receiving photodiode, or the voltage induced in the receiving photodiode. The use of receiving photodiodes simplifies the controller and the receiving unit.

In one advantageous development, the controller has a means for controlling the received light power of the receiving photodiode, which uses the transmission unit to transmit to the optical bus system a signal for controlling the light power to the transmitter of the optical power as a function of the discrepancy between the determined optical received power and the received power at the ideal operating point of the receiving photodiode.

It has also been found to be advantageous to minimize interference effects such as jitter, variance of the bending radii, variance of the fiber lengths etc., by the transmitting unit which is transmitting the optical signal receiving a control signal which controls the light power to be transmitted such that the receiving photodiode receives a light power at the ideal operating point of the receiving photodiode. This makes it possible to use a signal for increasing the light power to be transmitted to minimize attenuation settings, and to use a signal for reducing the light power to be transmitted to minimize the gain levels.

The means for control preferably has a memory means in which the light power required for the ideal operating point of the receiving photodiode is stored. In particular, the memory means is in the form of a non-volatile semiconductor memory, so that the data need not be reloaded when the controller is switched off.

The means for control preferably has an evaluation unit for comparison of the measured optical received power and the stored ideal operating point, thus simplifying the evaluation.

In one advantageous development, the means for determination of the optical received power is arranged in the communication controller or in the microcontroller. Corresponding to the arrangement chosen for the means for determination of the optical received power, the communication controller or the microcontroller has an input port which is connected via a signal line to the output port. Furthermore, the means for determination of the optical received power is in the form of a digital circuit or a software module.

The means for controlling the received light power is preferably arranged in the communication controller or in the microcontroller. Furthermore, the means for controlling the received power is in the form of a digital circuit or a software module.

The arrangement of the means for determination of the optical received power and/or of the means for controlling the received light power in the communication controller and/or microcontroller allows flexible design of the controller. Furthermore, the costs are minimized.

The means for determination of the optical received power as well as the means for controlling the received light power are preferably arranged in the microcontroller, as a software module. This has the advantage that there is no need to make any more adaptations to an already existing communication controller. In this case, it should be noted that the communication controller is an integrated semiconductor component, and that changes to integrated components are more costly and time consuming. Furthermore, the microcontroller has computation means on which the software module can run. The additional input port on the microcontroller for receiving the measurement data from the receiving unit can be provided with minimal costs.

In one advantageous development, the output port of the receiving unit has a bus connection which can be coupled to a bus connection of the communication controller or microcontroller by means of a data line, with the data being transmitted from the receiving unit to the communication controller or microcontroller via the bus connection by means of a bus protocol, so that measurement data and/or data relating to the optical received power as well as input data are transmitted via the one output port. This output port of the receiving unit is advantageous if the controller has an internal appliance bus.

Since the ideal operating point of the receiving photodiode is dependent on the temperature, a temperature sensor is positioned close to the receiving unit, whose temperature measurement data is transmitted to the means for controlling the received light power, with the means for controlling the received light power determining the signal to be transmitted as a function of the temperature measurement data. This has the advantage that disturbance effects resulting from temperature fluctuations in the receiving unit are minimized.

The light power for the ideal operating point is advantageously stored as a function of the temperature of the receiving photodiode in the memory means in the means for controlling the received light power. Furthermore, the evaluation unit includes the temperature measurement data as well as the stored temperature-dependent light power in the comparison process, thus allowing the light power to be determined in an optimized manner for the ideal operating point of the receiving photodiode.

In one development of the controller, the communication controller is positioned close to the receiving unit. This measure minimizes the length of the electrical signal lines between the receiving unit and the communication controller. Problems resulting from electromagnetic compatibility (EMC) are reduced in a corresponding manner.

BRIEF DESCRIPTION OF THE DRAWINGS

There are now various possible ways to refine and to develop the teaching of the present invention in an advantageous manner. For this purpose, reference should firstly be made to the dependent claims, and secondly to the following description of one exemplary embodiment. Those advantageous refinements which result from any desired combination of the dependent claims should also be included. The drawing illustrates one embodiment of the apparatus according to the invention, and, in the figures, in each case illustrated schematically:

DETAILED DESCRIPTION OF THE INVENTION

Figure 1:
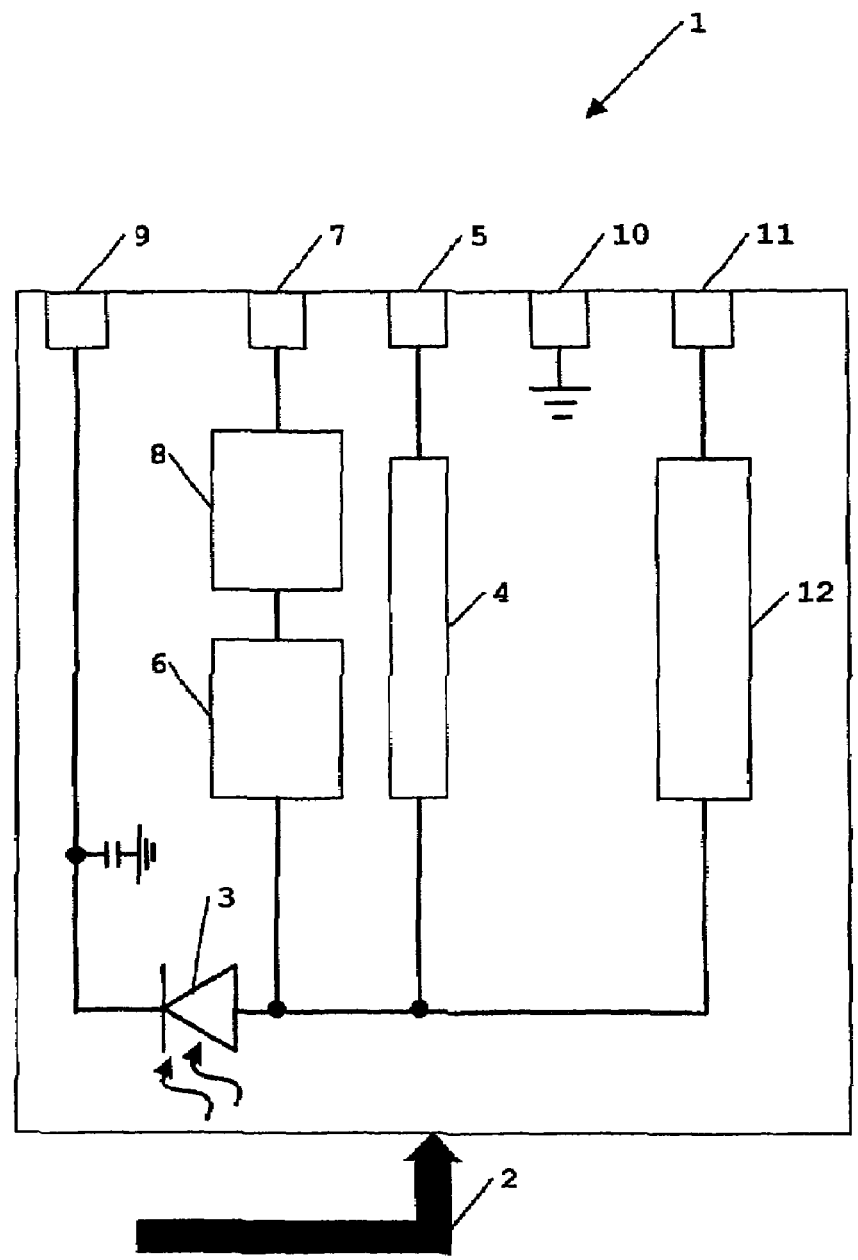
FIG. 1 shows a receiving unit according to the invention.

FIG. 1 shows the receiving unit 1 according to the invention for a controller 13 for reception of input data. The input data is transmitted in the form of optical signals in an optical bus system 2 in a vehicle. The receiving unit 1 can be coupled to an optical bus system 2 and has a means 3 for conversion of optical signals to electrical signals. Furthermore, a measurement arrangement 6 is provided, which measures a characteristic variable for the optical received power. The measurement arrangement 6 is in the form of a digital circuit. Furthermore, an output port 7 is provided, for passing on the digitized measurement data.

The receiving unit 1 according to the invention is used in the multimedia network technology MOST (Media Oriented Systems Transport), as part of an optical ring bus system 2 for infotainment applications in a vehicle. The optical bus system 2 uses polymer-optical waveguides as the transmission medium, which are used for interchanging data between the controllers 13 which are connected to the optical bus system 2. The controllers 13 for infotainment applications in a vehicle are man-machine interfaces, voice control, navigation, the Internet, a PC interface, a sound system, a mobile telephone, a headset, telematics applications, and media drives such as CDs, MDs, DVDs etc.

The receiving unit 1 has a receiving photodiode 3 for conversion of the optical signals arriving from the bus system 2 to electrical signals. The electrical signals are digitized in the digitization unit 4 using conventional methods. For this purpose, the voltage signal which is tapped off at the receiving photodiode 3 is filtered, is amplified and, for example, is corrected by means of data slicing or pulse-width correction. The digitization unit converts this data to a digital signal. This digitized input data is produced at the output port 5 for transmission to a communication controller 15.

The receiving unit 1 has a measurement arrangement 6 for measurement of the current which is induced in the receiving photodiode 3 by means of the arriving optical signal. The current which is induced in the receiving photodiode 3 is proportional to the received light intensity. The measured current signal is filtered, and is amplified. In addition, the measurement arrangement 6 has an A/D converter, by means of which the current signal is digitized.

Figure 4:
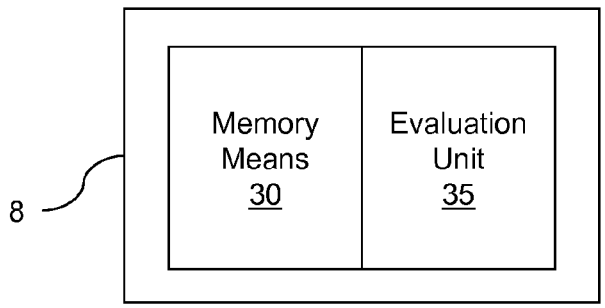
FIG. 4 shows a means for determination of the optical received power according to the present invention.

In addition, the receiving unit 1 has a means for determination of the optical received power 8, which associates the digitized current signal with an optimum received power. For this purpose, the means for determination of the optical received power 8 has a non-volatile semiconductor memory (illustrated in FIG. 4 as memory means 30), in which the characteristic of the receiving photodiode 3 is stored, in terms of the induced current, and the optical power received in the receiving photodiode 3. In addition, the means 8 for determination of the optical received power has a comparator (illustrated in FIG. 4 as evaluation unit 35), which uses software to compare the digitized current value with the stored characteristic, and uses interpolation to produce a value for the optical received power at the receiving photodiode 3. This value is produced at the output port 7, for transmission.

The receiving unit 1 is in the form of an integrated semiconductor component.

Alternatively, the output port 5 in the receiving unit 1 for data transmission to a communication controller 15 may be in the form of a bus connection. This output port 5 in the form of a bus connection can be coupled to an internal appliance bus and, for example, a communication controller 15 can likewise be linked to it. This output port 5 configured in this way can be used for transmission of the input data and of the measurement data via the internal appliance bus by means of a bus protocol.

Figure 2:
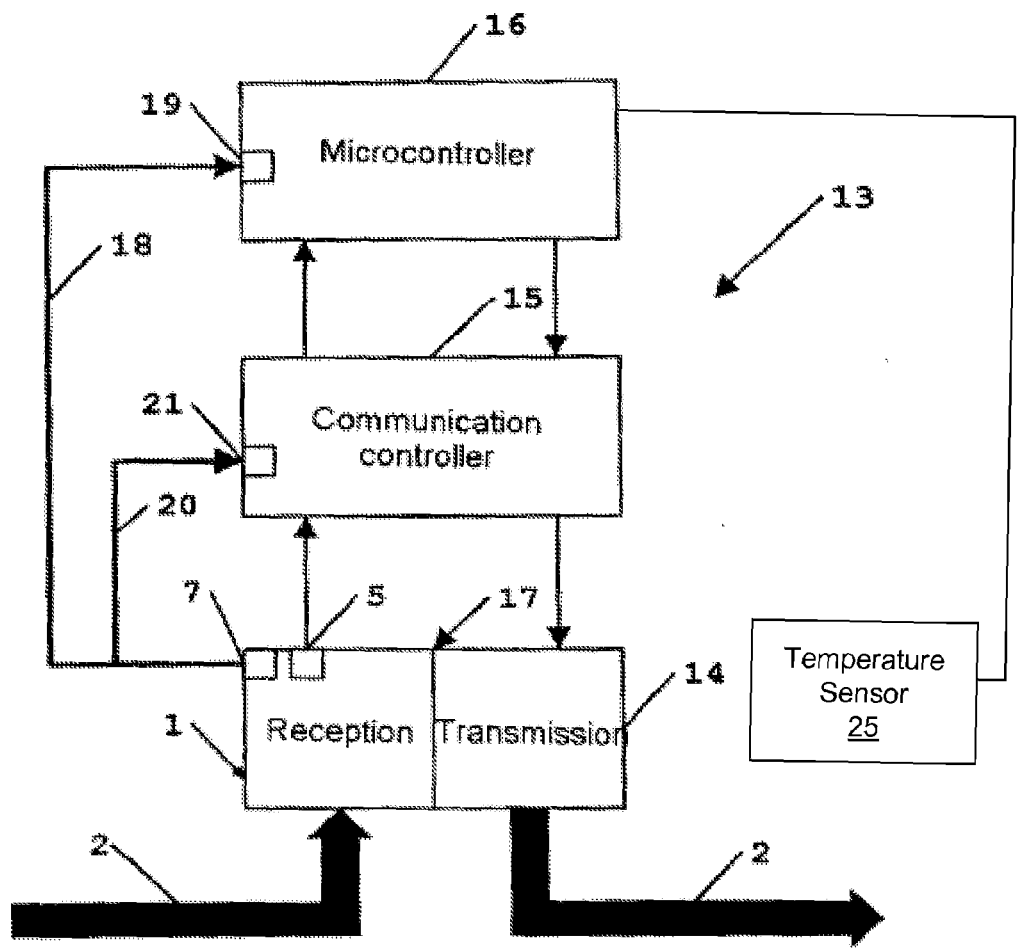
FIG. 2 shows a controller according to one aspect of the invention.

FIG. 2 shows a controller 13 which can be coupled to the optical bus system 2. In addition to an appliance functional unit as already described above by way of example and as implemented in the microcontroller 16, the controller 13 contains a communication controller 15 and an optoelectronic transmitting and receiving unit 14,1.

In order to provide their appliance function, the microcontroller 16 and the communication controller 15 have at least one input and/or output unit, one processor and a corresponding memory and power supply.

The data interchange between the controllers on the bus system 2 is controlled via the communication protocol MOST (Media Oriented Systems Transport) which, by way of example, defines the maximum length of the payload data to be transmitted or of the data packet, the addressing, the format, the type of transmission, etc. The payload data corresponds to the data to be transmitted from the microcontroller 16 in the controller 13, excluding the addressing and protocol data which are likewise required for transmission purposes.

The payload data to be transmitted by and received from the controller 13 is transmitted from the microcontroller 16 to the communication controller 15, and then to the transmitting unit 14 or from the receiving unit 1 to the communication controller 15, and then to the microcontroller 16.

Data is transmitted and is received in the form of data packets or messages via the transmitting/receiving unit 14,1 by means of the MOST protocol implemented in the communication controller 15. In this case, the payload data to be transmitted from the controller 13 is transmitted together with addressing data and with additional information, such as the length of the data string, the start and end of the message, etc., in a defined message frame and is sent as a data packet in the message frame, which must be resolved again by the receiver. The communication controller 15 in this case ensures that the bit stream, from and to the microcontroller 16 and from and to the transmitting/receiving unit 14,1 is produced, resolved and checked in accordance with the communication protocol.

The receiving unit 1 as well as the transmitting unit 14 are in the form of a component FOT (Fiber Optical Transceiver) 17, with the transmitting unit 14 and the receiving unit 1 being electronically separated. Each controller 13 is connected to the optical bus system 2 via a standardized plug.

The transmitting unit 14 converts electrical signals to optical signals, and transmits these to the optical waveguide for the optical bus system 2.

As described above, the receiving unit 1 converts the optical signals to electrical signals, and sends this digitized input data via the output port 5 to the communication controller 15.

The receiving unit 1 has a measurement arrangement 6 for measurement of the current which is induced in the receiving photodiode 3 by means of the arriving optical signal. The current which is induced in the receiving photodiode 3 is proportional to the received light intensity. The measured current signal is filtered and amplified. In addition, the measurement arrangement 6 has an A/D converter, by means of which the current signal is digitized.

Figure 5:
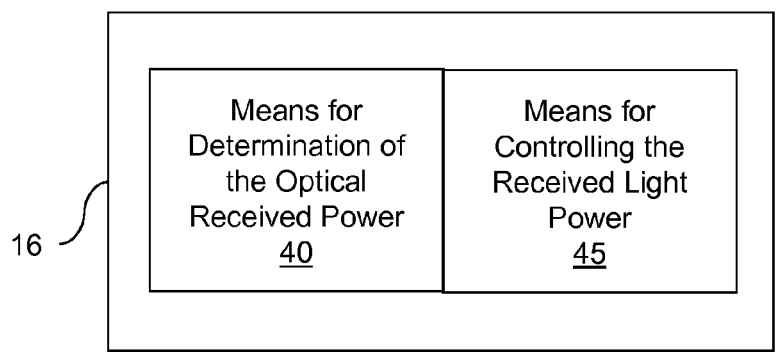
FIG. 5 shows a microcontroller according to the present invention.

As illustrated in FIG. 5, microcontroller 16 has a means for determination of the optical received power 40, and a means for controlling the received light power 45. Both means are in the form of software in the microcontroller. The digitized measurement data is transmitted to the means for determination of the optical received power via the signal line 18, which connects the output port 7 of the receiving unit 1 to an input port 19 of the microcontroller 16.

The means for controlling the light power received by the receiving photodiode, which emits a signal for controlling the light power to the transmitter via the transmitting unit 14 to the optical bus system 2, as a function of the discrepancy between the measured optical received power and the received power at the ideal operating point of the receiving photodiode, is, as stated above, likewise integrated in the form of software in the microcontroller 16.

The means for controlling the received light power has a memory in which the light power for the ideal operating point of the receiving photodiode is stored. Furthermore, the means for control has a comparator for comparison of the measured optical received power and the stored ideal operating point. If the comparison shows that the received light power is in the region of the ideal operating point of the receiving photodiode, and the receiving photodiode is thus operating optimally, no control action is taken. If the received light power is away from the region of the optimum operating point of the receiving photodiode, the means for control sends a signal via its transmitting unit 14 to the transmitter of the received signal. Depending on the discrepancy from the optimum operating point, the signal contains an instruction to the transmitter to reduce or to increase its light power by, for example, several dB.

Figure 6:
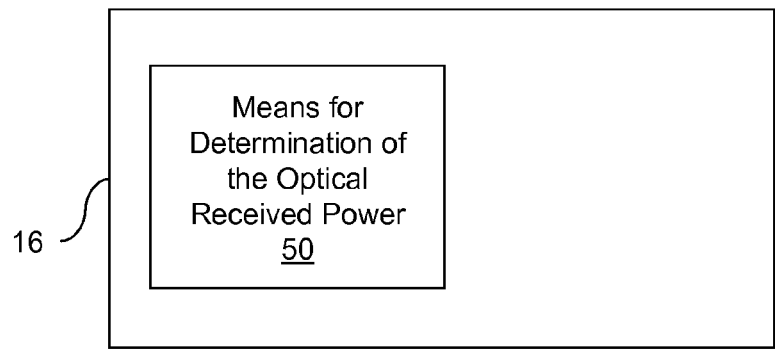
FIG. 6 shows a communication controller according to the present invention.

Alternatively, as illustrated in FIG. 6, the means for determination of the optical received power 50 may also be integrated in the communication controller 15. In this situation, the communication controller 15 would have a signal line 20, which connects the output port 7 of the receiving unit 1 to an input port 21 of the communication controller 15.

Alternatively, the means for controlling the received light power may also be integrated in the form of hardware or software in the communication controller.

A further alternative arrangement in the controller 13 is a receiving unit 1 which has the means for determination of the optical received power, so that the receiving unit 1 provides the instantaneous optical received power at the output port 7 or 5 for transmission. In this arrangement, the means for control may be integrated in the communication controller 15 or in the microcontroller 16. Depending on the arrangement of the means for controlling the received light power, a signal line 18 or 20 must be provided to the corresponding input port 19 or 21.

Figure 3:
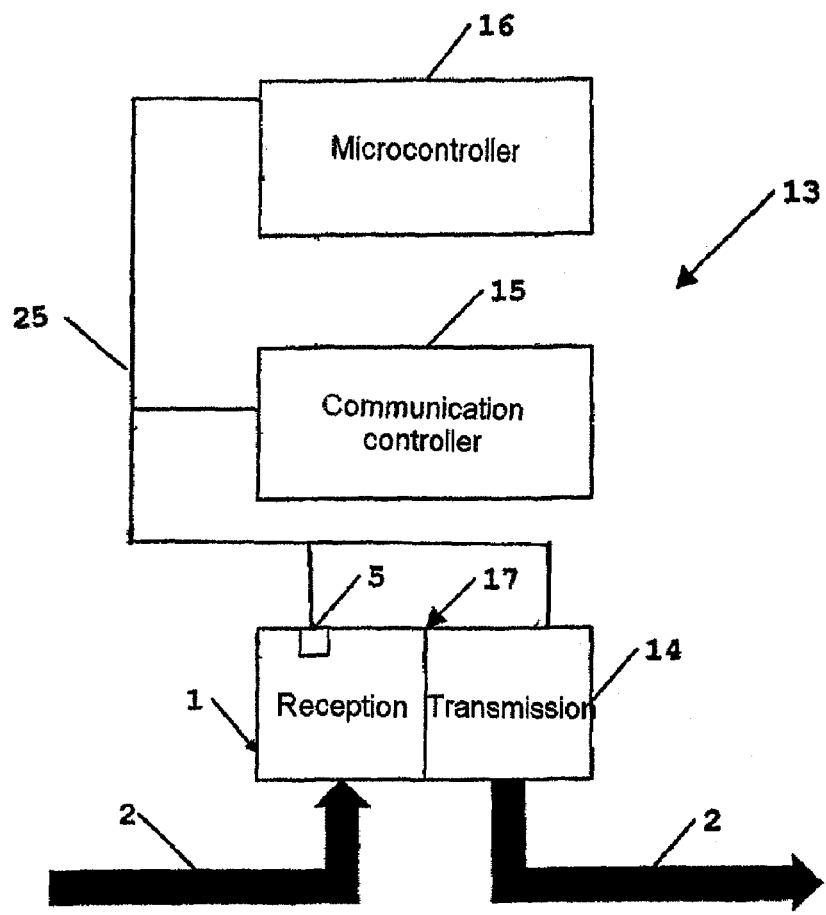
FIG. 3 shows a controller according to another aspect of the invention.

As illustrated in FIG. 3, if the transmitting/receiving unit 17, the communication controller 15 and/or microcontroller 16 are connected via an internal bus 25, then the additional signal lines 18, 20 and the corresponding ports 7, 19, 21 are no longer required.

As a further alternative embodiment, illustrated in FIG. 2, a temperature sensor 25 is positioned close to the transmitting/receiving unit 17, whose temperature measurement data is supplied to the microcontroller 16 via the optical bus system 2, or via an additional signal line, and is also processed by the microcontroller 16. The light power which is stored in the memory of the means for control for the ideal operating point, which is stored in the memory of the means for control, is stored as a function of the temperature of the receiving photodiode 3. In the control process, that is to say when making the decision as to whether and by how many dB the light power of the transmitter should be lowered or raised, the instantaneous temperature measurement value and the measured optical power are now compared by means of the comparator with the temperature-dependent, stored ideal operating point.

In present controller designs, the microcontroller 16 and the communication controller 15 are combined as separate units on one board, for physical space reasons.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

What is claimed is:

1. A receiving unit for a controller for reception of input data which is transmitted in the form of optical signals in an optical bus system in a vehicle, the receiving unit coupled to an optical bus system and comprising a means for conversion of optical signals to electrical signals, wherein the receiving unit and/or the controller includes a measurement arrangement which measures a characteristic variable of the optical received power and generates digitized measurement data, and an output port for passing on the digitized measurement data, a means for determination of the optical received power which has a memory means in which a characteristic is stored, the stored characteristic represents the relationship between the measured characteristic variable and the corresponding optical received power, and wherein the means for determination of the optical received power has an evaluation unit which compares the measured characteristic variable with the characteristic and passes on the determined optical received power to the output port.

2. The receiving unit as claimed in claim 1, wherein the means for determination of the optical received power is a digital circuit or a software module.

3. The receiving unit as claimed in claim 1, wherein the means for conversion of optical signals to electrical signals is a receiving photodiode, and the characteristic variable is current, or voltage induced in the receiving photodiode.

4. The receiving unit as claimed in claim 1, wherein the output port is a bus connection which is coupled to a bus connection of a further unit by means of a data line, with the data being transmitted from the receiving unit to the further unit via the bus connection by means of a bus protocol, so that measurement data and/or data relating to the optical received power as well as input data are transmitted via the one output port.

5. A controller, comprising:
a transmitting/receiving unit that includes a transmitting unit and a receiving unit, the transmitting/receiving unit coupling the controller to an optical bus system in a vehicle, the controller interchanging data using the transmitting/receiving unit via the optical bus system in the form of optical signals, the receiving unit for reception of input data, the receiving unit having a means for conversion of optical signals to electrical signals and having a measurement arrangement which measures a characteristic variable for the optical received power and generates digitized measurement data, the transmitting unit having means for conversion of electrical signals to optical signals for transmission of optical signals to the optical bus system;
a communication controller with means for conversion of data in accordance with a bus protocol, the receiving unit and the transmitting unit being connected to the communication controller via a respective signal line;
a microcontroller which is connected via signal lines for reception and transmission of data to the communication controller, wherein the receiving unit has an output port for passing on the digitized measurement data to the communication controller and/or microcontroller;
a means for determination of the optical received power, which means has a memory means in which a characteristic is stored which represents the relationship between the measured characteristic variable and the corresponding optical received power;
an evaluation unit which compares the measured characteristic variable with the characteristic, wherein the means for determination and the evaluation unit are components of at least one of the microcontroller and receiving unit; and
a means for controlling the received light power of the receiving photodiode, which uses the transmission unit to transmit to the optical bus system a signal for controlling the light power to the transmitter of the optical power as a function of the discrepancy between the determined optical received power and the received power at an ideal operating point of the receiving photodiode.

6. The controller as claimed in claim 5, wherein the means for conversion of optical signals to electrical signals is a receiving photodiode and the characteristic variable is current or voltage induced in the receiving photodiode.

7. The controller as claimed in claim 6, wherein the means for control has a memory means in which the light power for the ideal operating point of the receiving photodiode is stored, and the means for control has an evaluation unit for comparison of the measured optical received power and the stored ideal operating point.

8. The controller as claimed in claim 5, wherein the means for determination of the optical received power is arranged in the communication controller or the microcontroller and, in a corresponding manner to the arrangement of the communication controller or of the microcontroller, has an input port which is connected via a signal line to the output port, and the means for determination of the optical received power is a digital circuit or a software module.

9. The controller as claimed in claim 5, wherein the means for controlling the received light power is arranged in the communication controller or in the microcontroller, and the means for controlling the received power is a digital circuit or a software module.

10. The controller as claimed in claim 5, wherein the output port of the receiving unit is a bus connection, which can be coupled to a bus connection of the communication controller or microcontroller by means of a data line, with the data being transmitted from the receiving unit to the communication controller or microcontroller via the bus connection by means of a bus protocol, so that measurement data and/or data relating to the optical received power and input data are transmitted via the output port.

11. The controller as claimed in claim 5, wherein a temperature sensor is positioned close to the receiving unit, whose temperature measurement data is transmitted to the means for controlling the received light power, the means for controlling the received light power determining the signal to be transmitted as a function of the temperature measurement data.

12. The controller as claimed in claim 11, wherein the light power for the ideal operating point is stored as a function of the temperature of the receiving photodiode in the memory means for the means for controlling the received light power, and the evaluation unit includes the temperature measurement data and the stored temperature-dependent light power in the comparison process.

13. A controller, comprising:
a transmitting/receiving unit that includes a transmitting unit and a receiving unit, the transmitting/receiving unit coupling the controller to an optical bus system in a vehicle, the controller interchanging data packets using the transmitting/receiving unit via the optical bus system in the form of optical signals, the receiving unit for reception of data packets, the receiving unit having a means for conversion of optical signals, corresponding to the data packets, to electrical signals and having a measurement arrangement which measures a characteristic variable for the optical received power and generates digitized measurement data, the transmitting unit having means for conversion of electrical signals to optical signals for transmission of optical signals to the optical bus system;
a communication controller with means for conversion of data in accordance with a bus protocol, the receiving unit and the transmitting unit being connected to the communication controller via a respective signal line;
a microcontroller which is connected via signal lines for reception and transmission of data to the communication controller, wherein the receiving unit has an output port for passing on the digitized measurement data to the communication controller and/or microcontroller, the microcontroller comprising
a means for determination of the optical received power, which means has a memory means in which a characteristic is stored which represents the relationship between the measured characteristic variable and the corresponding optical received power; and
a means for controlling the received light power of the receiving photodiode, which uses the transmission unit to transmit to a transmitter of the data packets, by way of the optical bus system, a signal for controlling the light power of the optical power transmitted by the transmitter as a function of the discrepancy between the determined optical received power and the received power at an ideal operating point of the receiving photodiode.

* * * * *